US012626944B2

(12) United States Patent
Corrigan et al.

(10) Patent No.: US 12,626,944 B2
(45) Date of Patent: May 12, 2026

(54) ANTIOXIDANT SUBSTITUTED SULFONATED ION EXCHANGE MEMBRANES

(71) Applicant: The Lubrizol Corporation, Wickliffe, OH (US)

(72) Inventors: Thomas S. Corrigan, Lakewood, OH (US); Christopher M. Rasik, Cleveland, OH (US); William Storms-Miller, Lakewood, OH (US); Bryan Tucker, Lakewood, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 477 days.

(21) Appl. No.: 18/037,925

(22) PCT Filed: Dec. 1, 2021

(86) PCT No.: PCT/US2021/061373

§ 371 (c)(1),
(2) Date: May 19, 2023

(87) PCT Pub. No.: WO2022/119904

PCT Pub. Date: Jun. 9, 2022

(65) Prior Publication Data

US 2024/0006640 A1 Jan. 4, 2024

Related U.S. Application Data

(60) Provisional application No. 63/119,814, filed on Dec. 1, 2020.

(51) Int. Cl.

| | |
|---|---|
| ***H01M 8/1023*** | (2016.01) |
| ***H01M 8/1025*** | (2016.01) |
| ***H01M 8/103*** | (2016.01) |
| ***H01M 8/1039*** | (2016.01) |

(52) U.S. Cl.

CPC ....... *H01M 8/1023* (2013.01); *H01M 8/1025* (2013.01); *H01M 8/103* (2013.01); *H01M 8/1039* (2013.01); *H01M 2300/0082* (2013.01)

(58) Field of Classification Search

None

See application file for complete search history.

(56) References Cited

U.S. PATENT DOCUMENTS

2022/0166044 A1* 5/2022 Chae ..................... H01M 8/103

FOREIGN PATENT DOCUMENTS

| | | | |
|---|---|---|---|
| JP | 11-114430 | | 4/1999 |
| WO | 98/22217 | A1 | 5/1998 |

OTHER PUBLICATIONS

Gubler Lorentz, "Radiation Grafted Membranes for Polymer Electrolyte Fuel Cells", Jan. 1, 2016, pp. 1-293, retrieved from the internet URL: https://www.psi.ch/sites/default/files/import/lec/LECFilesEN/GL_habil.pdf, retrieved on Feb. 10, 2022, pp. 177-195.

Yves Buchmuller, et al., "Polymer-Bound Antioxidants in Grafted Membranes for Fuel Cells", Journal of Materials Chemistry A, vol. 2, No. 16, Jan. 1, 2014, p. 5870.

* cited by examiner

*Primary Examiner* — Eli S Mekhlin

(74) *Attorney, Agent, or Firm* — Christopher P. Demas; Michael A. Miller

(57) ABSTRACT

The disclosed technology relates to antioxidant substituted sulfonic acid polymers and ion exchange membranes prepared therefrom. The bonding of the polymer with an antioxidant can minimize the antioxidant from interfering with ion conductivity and prevent the antioxidant from leaching onto other layers or onto catalysts.

14 Claims, No Drawings

ANTIOXIDANT SUBSTITUTED SULFONATED ION EXCHANGE MEMBRANES

CROSS REFERENCE TO RELATED APPLICATION

This application claims priority from PCT Application Serial No. US21/061373 filed on 1 Dec. 2021, which claims the benefit of U.S. Provisional Application No. 63/119,814 filed on 1 Dec. 2020, the entirety of which is hereby incorporated by reference.

BACKGROUND OF THE INVENTION

The disclosed technology relates to antioxidant substituted sulfonic acid polymers and ion exchange membranes prepared therefrom.

Proton exchange membrane fuel cells (PEMFCs) are a promising technology to enable the diversification of drivetrains for heavy duty vehicle applications and provide clean fuel alternatives to traditional combustion engines. Lifetime requirements and high demand placed on heavy duty PEMFCs leads to premature failure of the polymer electrolyte membrane (PEM), a critical PEMFC component. Over time, free radical species produced during normal operation of PEMFCs chemically react with the PEM, compromising system performance by decreasing mechanical integrity and proton conductivity. Current strategies to address this issue utilize some combination of the use of end group fluorination of perfluorosulfonic acid (PFSA) polymers and suspended metallic antioxidants (Ce or Mn). Unfortunately, unbound metallic antioxidants cause an undesirable decrease in proton conductivity as well as leaching into other layers of the membrane electrode assembly (MEA), exposing the membrane to radical degradation and poisoning of catalysts. These same issues can occur in anion exchange membranes.

There is a need for a polymer electrolyte membrane that can withstand attack by free radical species without the drawbacks associated with free radical scavengers, such as simple ionically associated metallic antioxidants that may be transported through the membrane.

SUMMARY OF THE INVENTION

The disclosed technology solves the problem of polymer electrolyte membrane (PEM) degradation from free radical species by covalently bonding an antioxidant to the PEM, either directly, or through a linking group. The bonding of the PEM with antioxidant can also minimize the antioxidant from interfering with ion conductivity and prevent the antioxidant from leaching into other layers or onto catalysts.

The disclosed technology therefore provides a polymer composition having sulfonic acid moieties, wherein the polymer comprises 0.2 to 25 mol % relative to the sulfonic acid moieties of an antioxidant covalently bonded directly, or through a linking group, to the polymer.

Also provided is an ion exchange membrane prepared from the polymer composition, as well as a membrane electrode assembly, and fuel cell containing the ion exchange membrane.

DETAILED DESCRIPTION OF THE INVENTION

Various preferred features and embodiments will be described below by way of non-limiting illustration.

The technology provides an antioxidant substituted sulfonic acid polymer composition having a certain amount of antioxidant covalently bonded to the polymer directly, or through a linking group, relative to the sulfonic acid moieties of the polymer. Methods of determining the content of sulfonic acid moieties in a sulfonic acid polymer are well-known in the art and include, for example, through monomer composition and measurement of ion exchange capacity (IEC).

Sulfonic acid polymers are widely discussed in the literature and are not particularly limited here. Examples of sulfonic acid polymers include any sulfonate ion exchange polymer, which is to say, polymers containing sulfonic acid moieties. Sulfonic acid polymers can include, but are not limited to, perfluorosulfonic acid polymers, sulfonated poly(benzimidazole) polymer, sulfonated poly(ether ether ketone) polymer, sulfonated polyvinyl chloride, 2-acrylamido-2-methylpropane sulfonic acid (AMPS), and poly(styrene sulfonate) (block co) polymer, as examples, but the sulfonic acid could be any other sulfonic acid polymer now known or developed in the future.

The antioxidants that may be covalently bonded directly, or through a linking group, to the sulfonic acid moieties of the sulfonic acid polymers can be any of the known antioxidants. An antioxidant is a compound which is able to inhibit an oxidative attack of an aggressive chemical species to, for example, the ion exchange material. Under the operation conditions of a fuel cell, peroxides and other free radicals may be such aggressive chemical species. Consequently, radical scavengers or hydrogen peroxide decomposition catalysts are examples of suitable antioxidants.

Examples of radical scavenger antioxidants can include, but are not limited to, hindered amines; hydroxylamines; arylamines; poly(arylamines); phenols; polyphenols; butylated hydroxytoluene; phosphites; benzofuranones; salicylic acid; azulenyl nitrones and derivatives thereof; tocopherols; 5,5-dimethyl-1-pyrroline-N-oxide; cyclic and acyclic nitrones; gold-chitosan nanocomposites; ascorbic acid; heteropoly acids, and molybdenum based, such as molybdenum dithicarbamates, dithiophosphates, molybdenum sulfides, or molybdenum oxides.

Examples of hydrogen peroxide decomposition catalysts can include, but are not limited to, lanthanide series metal cations and, in a more specific embodiment, cerium and lanthanum, and mixtures thereof.

One suitable example of an inorganic antioxidant additive is $MnO_2$. Other examples could include tungsten, vanadium, or antimony Moreover, one suitable example of an organic antioxidant additive is triphenylphosphine. Furthermore, organic/inorganic hybrid additives are also suitable, as well as combinations of the aforesaid examples Other example antioxidant functional groups can include, but are not limited to, heteroaromatic; sulfide; disulfide; polysulfide; sulfurized olefin; zinc based; dithiophosphate; dithiocarbamates; dithiophosphoric acid; phosphine; phosphite; hydroquinone; catechol; quinone; flavin; chroman; chromanone; pyridyl; bipyridyl; diphenylamines; phenoxazines; phenothiazines; benzazepines; aminodibenxyl; lignin, lignosufonate and salicylate.

Some of the antioxidants, as will be appreciated by those of skill in the art, will have sufficient olefinic character that they may be grafted onto the polymer backbone or side-chains thereof. Eugenol; isoeugenol; and N-(4-(phenylamino)phenyl)acrylamide are examples of antioxidants with olefinic character.

Antioxidants containing a reactive olefin may be grafted to the sulfonic acid polymer directly with or without the use of a protecting group for the antioxidant moiety. The antioxidant can be grafted either to the polymer backbone or onto a sidechain from the polymer backbone. Several methods may be employed for grafting the antioxidant, such as ozone or atom transfer radical polymerization (ATRP) to initiate free radicals on the polymer backbone or sidechain. Another method can be by suitable radical initiator to induce radical formation on the polymer. An antioxidant containing a reactive olefin (e.g. eugenol; isoeugenol; N-(4-(phenylamino)phenyl)acrylamide; etc.) may be reacted at the resulting radical sites on the sulfonic acid polymer at a total concentration corresponding to the desired amount of antioxidant relative to the sulfonic acid moiety content. Protecting groups may optionally be required to prevent radical quenching by the antioxidant. Protecting groups may be any commonly encountered protecting group that are easily removed (e.g. t-butyl ether; benzyl; carbonate; carbamate; silyl; etc.).

In instances where an antioxidant cannot be grafted directly to the polymer backbone or a sidechain of the polymer, a "linking group" is needed to bridge between the polymer and the antioxidant. The linking group functions to tether the antioxidant onto the polymer (i.e., backbone, side chain, or sulfonic acid moieties).

One example of a linking group are electrophiles. Sulfonic acid polymers can be functionalized with an appropriate electrophile through radical grafting. The electrophile can be grafted either to the polymer backbone or onto a sidechain from the polymer backbone. Several methods may be employed for grafting, such as ozone or atom transfer radical polymerization (ATRP) to initiate free radicals on the polymer backbone or sidechain. Another method can be by suitable radical initiator to induce radical formation on the polymer. An electrophile linking group containing a reactive olefin (e.g. maleic anhydride; acrylate ester; glycidol acrylate; acryloyl chloride; etc.) can be reacted at the resulting radical sites on the sulfonic acid polymer at a total concentration corresponding to the desired amount of antioxidant relative to the sulfonic acid moiety content. The resulting electrophile functionalized sulfonic acid polymer can then be further functionalized with the addition of the desired antioxidant, for example, by nucleophilic reaction with the linking group.

Electrophiles can include, but are not limited to, for example, carbonyls such as maleic anhydride, acrylate esters, epoxides, glycidol acrylate, alkyl halides, acryloyl chloride, and the like.

Conversely, the linking group may contain functional groups other than electrophiles that can be attached to the antioxidant moiety. These functional groups may be, but are not limited to nucleophilic carbon, oxygen, nitrogen, sulfur, or phosphorus atoms. Further, linking groups may be attached to the polymer at sites where radicals have been initiated through functional groups other than olefins. One example is through radical coupling with an aminoxyl radical such as 2,2,6,6-Tetramethylpiperidin-1-yl)oxyl or derivatives thereof.

Other linking groups can include, for example, amines and aryl ethers. Amine and aryl ether linking groups covalently bind to the sulfonic acid moiety. Binding of amine and aryl ether groups is accomplished generally by first halogenating the sulfonic acid moiety. Sulfonic acid moieties on the polymer may be converted to sulfonyl halides by reacting the polymer with the desired halide. Methods of halogenating a sulfonic acid moiety are well known in the art and include, for example, using a halogenating agent, such as, for example, $SOCl_2$, $POCl_3$, PCI, triphosgene, cyanuric chloride, etc.). In some instances, a halide may already be present on the sulfonic acid polymer, such as, for example, in the case of perfluorosulfonyl fluoride polymers. In either case, the sulfonyl halide moieties can be prepared into an antioxidant substituted sulfonic acid polymer by two very similar methods: either 1) reacting the sulfonyl halide moieties with one of the desired linking groups (i.e., amine and/or aryl ether) to form a sulfonamide or sulfate ester, followed by reacting the sulfonamide/sulfate ester with the desired antioxidant in a nucleophilic addition, or 2) reacting a pre-linked amine-antioxidant or aryl ether-antioxidant group to the sulfonyl halide. Pre-linked amine-antioxidant or aryl ether-antioxidant groups may be purchased or may be prepared. Preparation of such pre-linked groups can be achieved by simple reaction of an antioxidant functional group with a molecule containing a nucleophile. Examples could include alkylation with an alkylene oxide or mixtures thereof, such as ethylene oxide or propylene oxide, 2-hydroxyethyl acrylate, or any other electrophilic linking group in which the reaction product of the antioxidant molecule and linking group results in a nucleophile functionalized antioxidant.

Amine linking groups are not particularly limited and can include, for example, primary and secondary amines, including alkyl and aryl amines. For purposes here, ammonia is considered an amine.

Aryl ether linking groups are not particularly limited and can include, for example, phenyl ether.

The linking groups may be added to the polymer (backbone, side chain, or sulfonic acid moieties, depending on method employed) already covalently bonded to the antioxidant, or the antioxidant may be reacted onto the linking group after the linking group is bound to the polymer.

In addition, the linking group/antioxidant can be bonded to the sulfonic acid polymer as part of the finished sulfonic acid polymer, or at some stage in the process of preparation of the polymer. For example, the linking group/antioxidant may be added to a monomer containing sulfonic acid moieties prior to the monomer being polymerized into the final polymer.

The antioxidant substituted sulfonic acid polymer will have a certain amount of antioxidant covalently bonded to the polymer directly, or through a linking group, relative to the sulfonic acid moieties of the polymer. As discussed above, to be covalently bonded to the polymer means to be bonded to the polymer backbone itself, to a sidechain of the backbone, or to a sulfonic acid moiety. Reference to "relative to the sulfonic acid moieties" means that for every 100 sulfonic acid moieties there will be a certain amount of antioxidant. In an embodiment the antioxidant substituted sulfonic acid polymer can have from about 0.2 to about 25 mol % antioxidant relative to the sulfonic acid moieties on the polymer; meaning that for every 100 sulfonic acid moieties in the polymer there can be 0.2 to 25 antioxidant groups bonded directly, or through a linking group, to the polymer (i.e., polymer backbone, side chain, or sulfonic acid moiety). In some embodiments, the antioxidant substituted sulfonic acid polymer can have from about 0.25 to about 22.5 mol % antioxidant relative to the sulfonic acid moieties covalently bonded directly or through a linking group to the polymer. In some embodiments, the antioxidant substituted sulfonic acid polymer can have from about 0.3 to about mol % antioxidant relative to the sulfonic acid moieties covalently bonded directly or through a linking group to the polymer. In some embodiments, the antioxidant substituted sulfonic acid polymer can have from about 0.5 to about 18 mol % antioxidant relative to the sulfonic acid moieties covalently bonded directly or through a linking group to the polymer. In some embodiments, the antioxidant substituted sulfonic acid polymer can have from about 0.75 to about 15 mol % antioxidant relative to the sulfonic acid moieties covalently bonded directly or through a linking group to the polymer.

The antioxidant substituted sulfonic acid polymer can be formed into an ion exchange membrane by methods known in the art, such as, for example, casting, spraying, knife coating, extrusion, etc.

The ion exchange membrane prepared with the antioxidant substituted sulfonic acid polymer may be included in a fuel cell along with other components normally in a fuel cell, such as, for example, bipolar plates, an anode and a cathode, and diffusion media.

The membranes are configured and sized to be suitable for use in fuel cells, electrolyzers, electrodialyzers, solar hydrogen generators, flow batteries, desalinators, sensors, demineralizers, water purifiers, waste water treatment systems, ion exchangers, or $CO_2$ separators, for example, and can include any of the antioxidant substituted sulfonic acid polymers as described herein.

A fuel cell, electrolyzer, electrodialyzer, solar hydrogen generator, flow battery, desalinator, sensor, demineralizer, water purifier, waste water treatment system, ion exchanger, and $CO_2$ separator are also provided, the fuel cell, electrolyzer, electrodialyzer, solar hydrogen generator, flow battery, desalinator, sensor, demineralizer, water purifier, waste water treatment system, ion exchanger, and $CO_2$ separator including the exchange membrane including the antioxidant substituted sulfonic acid polymers.

A typical fuel cell can contain an anode and a cathode which are separated by the foregoing exchange membrane. The anode portion carries out an anode half-reaction which oxidizes fuel releasing electrons to an external circuit and producing oxidized products. The cathode portion carries out a cathode half-reaction which reduces an oxidizer consuming electrons from the external circuit. Gas diffusion layers (GDLs) may also be present, which serve to deliver fuel and oxidizer uniformly across respective anode and cathode. Charge neutrality is maintained by a flow of ions from the anode to the cathode for positive ions and from cathode to anode for negative ions. The exchange membrane is usually selected to be as thin as possible while maintaining the membrane's structural integrity and gas impermeability.

Although a principal application for the antioxidant substituted sulfonic acid polymers is for energy conversion such as in use in fuel cell exchange membranes, the exchange membranes can be used for many other purposes such as use in electrolyzers (e.g., water/carbon dioxide/ammonia electrolyzers), electrodialyzers; ion-exchangers; solar hydrogen generators; desalinators (e.g., desalination of sea/brackish water); demineralizers (e.g., demineralization of water); water purifiers (e.g., ultra-pure water production); waste water treatment systems; concentration of electrolyte solutions in the food, drug, chemical, and biotechnology fields; electrolysis (e.g., chlor-alkali production and $H_2/O_2$ production); energy storage (e.g., super capacitors, metal air batteries and redox flow batteries); sensors (e.g., pH/RH sensors); and in other applications where an anion-conductive ionomer is advantageous.

The disclosed technology solves the problem of polymer electrolyte membrane (PEM) degradation from free radical species by covalently bonding an antioxidant to the PEM either directly, or through a linking group. The bonding of the PEM with an antioxidant can also minimize the antioxidant from interfering with ion conductivity and prevent the antioxidant from leaching into other layers or onto catalysts.

EXAMPLES

| Example | Polymer | Linking group | Antioxidant | Loading |
|---|---|---|---|---|
| 1 | Nafion ® D520*; IEC 1.03-1.12 meq/g | 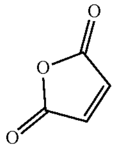 | 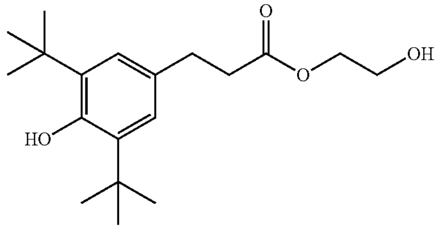 [SMILES: CC(C)(C)c1cc(CCC(=O)OCCO)cc(C(C)(C)C)c1O] | 5% |
| 2 | Nafion ® D520*; IEC 1.03-1.12 meq/g | 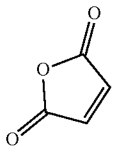 | 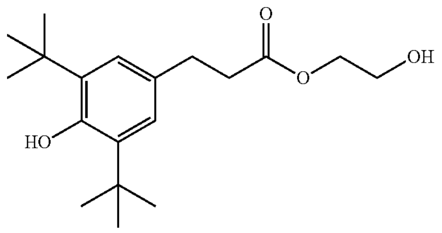 [SMILES: CC(C)(C)c1cc(CCC(=O)OCCO)cc(C(C)(C)C)c1O] | 10% |
| 3 | Nafion ® D520*; IEC 1.03-1.12 meq/g | 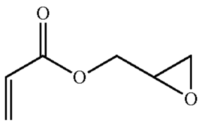 | 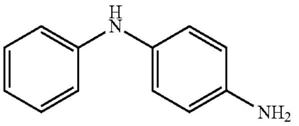 [SMILES: Nc1ccc(Nc2ccccc2)cc1] | 5% |

-continued

| Example | Polymer | Linking group | Antioxidant | Loading |
|---|---|---|---|---|
| 4 | Nafion ® D520*; IEC 1.03-1.12 meq/g | 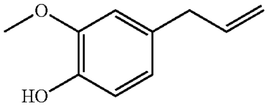 | 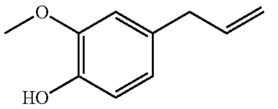 | 5% |
| 5 | Kraton NEXAR ® PBC**; IEC = 1.5 meq/g | 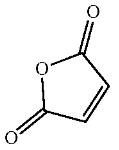 | 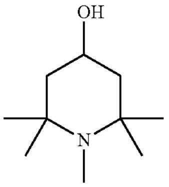 | 10% |
| 6 | Nafion ® R-1100*** sulfonyl fluoride | 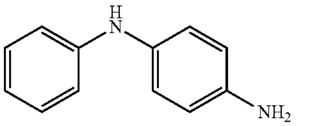 [SMILES: Nc1ccc(Nc2ccccc2)cc1] | 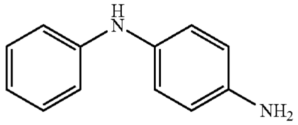 [SMILES: Nc1ccc(Nc2ccccc2)cc1] | 2.5% |
| 7 | Nafion ® R-1100*** sulfonyl fluoride | 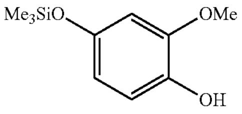 | 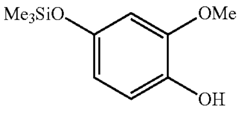 | 5% |
| 8 | Nafion ® R-1100*** sulfonyl fluoride | 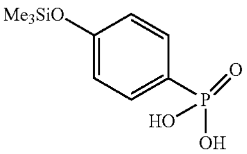 | $K_8SiW_{11}O_{39}$ | 5% |
| 9 | Aquivion ™ P98-$SO_2F$ | $NH_3$ | 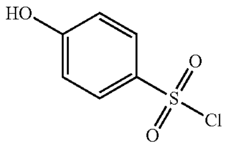 [SMILES: O=S(=O)(Cl)c1ccc(O)cc1] | 20% |
| 10 | Kraton NEXAR ® PBC**; IEC = 1.5 meq/g | 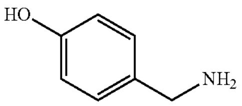 | 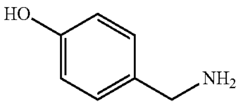 | 20% |

*Nafion ® R-1000 as described in U.S. Pat. No. 9,868,804 in an alcohol based 5 wt % solution

**sulfonated pentablock co-polymers comprised of Tert-butylstyrene-hydrogenated isoprene-sulfonated styrene:styrene-hydrogenated isoprene-tert-butylstyrene blocks

***Described in U.S. Pat. No. 9,868,804

Example 1

Preparation of 4-hydroxybenzenesulfonyl chloride: To 5 g of sodium 4-hydroxybenzene sulfonate was added 14.2 mL of thionyl chloride and 0.16 mL of DMF. The mixture was slowly heated to 60 C (gas evolution observed), and held for 4 h. The reaction mixture was then cooled to 23 C, and poured over ice (exotherm). The mixture was then extracted with dichloromethane 3x. The organic extracts were combined, dried over sodium sulfate, and concentrated under reduced pressure yielding the final product as a yellow oil, which crystalized to yellow needles upon storage under vacuum.

Perfluorosulfonamide polymer preparation: To 5 g of Aquivion™ P98-SO2F perfluorosulfonyl fluoride polymer pellets was added 15 mL $NH_3$ in methanol solution (7M ammonia). The reaction vessel was sealed and the reaction was allowed to proceed for 48 h at room temperature. IR was used to confirm the conversion of the SO2F group by disappearance of indicative IR peaks. The solid polymer was collected and washed with 3 to 1 mixture of methanol/DI H2O. The polymer was then added to an autoclave Parr reactor with 62 mL of DMF and the system was heated to 220 C/40 psi and stirred 5 h to disperse the polymer product. The polymer was then purified by precipitation and collected as a powder.

N-((4-hydroxyphenyl)sulfonyl) perfluorosulfonamide Polymer Preparation

To 1 g of Perfluorosulfonamide polymer powder was added 20 mL DMF with 1 equiv NEt3. The mixture was moderately heated disperse the polymer. The mixture was then cooled to RT and 1.97 g 4-hydroxy-benzenesulfonyl chloride was added dropwise, followed by 2.3 g triethylamine. the reaction was allowed to proceed for 3 h, then the polymer product was precipitated by adding the reaction mixture dropwise to 300 mL of ethyl acetate. The precipitated solid was collected by vacuum filtration and washed with additional ethyl acetate, 0.5 M sulfuric acid, and 1 M KOH, then dried under vacuum to obtain an off white/tan powder.

Example 2

N-(4-fluorobenzyl)sulfonamide Pentablock Copolymer 1.5 g Nexar™ MD9150 sulfonated pentablock copolymer (t-butyl-styrene/hydrogenated isoprene/styrene/hydrogenated isoprene/tert-butyl-styrene) is dissolved in 28 g anhydrous THF. 0.3 g of 4-hydroxybenzylamine is added and the mixture is allowed to stirred 30 min. 0.295 g trichlorotriazine (TCT) is then added followed by 0.29 g of triethylamine. The reaction is stirred 24 h, then the polymer is isolated by precipitation.

Polymer electrolyte membrane testing can be performed both ex-situ and in-situ in an operating fuel cell system. Ex-situ tests for performance and durability include In-plane conductivity via a Pt 4-probe test cell, water uptake measurements, degree of swelling, mechanical strength, and Fenton oxidation. In-situ testing is tests that are performed in an operating fuel cell consisting at a minimum of the polymer electrolyte membrane, electrodes, gas diffusion media, flow fields/bipolar plates, and current collectors/end plates. The tests can be performed according to the Department of Energy standards outlined in the Procedure for PEM Single Cell Testing and may include Polarization curves at various temperatures/relative humidity levels, hydrogen crossover, HFR (high frequency resistance), ECSA (electrochemical surface area), CV (cyclic voltammetry), EIS (electrochemical impedance), chemical durability—OCV (open current voltage), and mechanical durability via RH cycling, and combined mechanical/chemical durability testing utilizing simultaneous OCV and RH cycling Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

A polymer composition comprising sulfonic acid moieties, wherein the polymer comprises, consists essentially of, or consists of 0.2 to 25 mol %, relative to the sulfonic acid moieties, of an antioxidant covalently bonded directly, or through a linking group, to the polymer.

The polymer composition of the preceding paragraph, wherein the polymer composition comprises, consists essentially of, or consists of a perfluorosulfonic acid polymer or mixtures thereof. The polymer composition of the preceding paragraph, wherein the polymer composition comprises, consists essentially of, or consists of a sulfonated poly (benzimidazole) polymer or mixtures thereof. The polymer composition of the preceding paragraph, wherein the polymer composition comprises, consists essentially of, or consists of a sulfonated poly(ether ether ketone) polymer or mixtures thereof. The polymer composition of the preceding paragraph, wherein the polymer composition comprises, consists essentially of, or consists of a poly(styrene sulfonate) (block co) polymer or mixtures thereof. The polymer composition of the preceding paragraph, wherein the polymer composition comprises, consists essentially of, or consists of a sulfonated polyvinyl chloride polymer or mixtures thereof. The polymer composition of the preceding paragraph, wherein the polymer composition comprises, consists essentially of, or consists of a 2-acrylamido-2-methylpropane sulfonic acid (AMPS) polymer or mixtures thereof.

The polymer composition of any previous sentence, wherein the linking group comprises, consists essentially of, or consists of an amine or an aryl ether. The polymer composition of the previous sentence, wherein the amine comprises, consists essentially of, or consists of a primary amine or mixtures thereof. The polymer composition of any previous sentence of this paragraph, wherein the amine comprises, consists essentially of, or consists of a secondary amine or mixtures thereof. The polymer composition of any previous sentence of this paragraph, wherein the amine comprises, consists essentially of, or consists of an alkyl amine or mixtures thereof. The polymer composition of any previous sentence of this paragraph, wherein the amine comprises, consists essentially of, or consists of an aryl amine or mixtures thereof. The polymer composition of the first sentence of this paragraph, wherein the amine comprises, consists essentially of, or consists of ammonia. The polymer composition of the first sentence of this paragraph, wherein the aryl ether comprises, consists essentially of, or consists of phenyl ether.

The polymer composition of any previous sentence wherein the linking group comprises, consists essentially of, or consists of an electrophile. The polymer composition of the preceding sentence wherein the electrophile comprises, consists of, or consists essentially of a carbonyl or mixtures thereof. The polymer composition of the preceding sentence wherein the electrophile comprises, consists of, or consists essentially of maleic anhydride. The polymer composition of the first sentence of this paragraph wherein the electrophile comprises, consists of, or consists essentially of an acrylate ester or mixtures thereof. The polymer composition of the first sentence of this paragraph wherein the electrophile comprises, consists of, or consists essentially of an epoxide or mixtures thereof. The polymer composition of the preceding sentences wherein the electrophile comprises, consists of, or consists essentially of glycidol acrylate. The polymer composition of the first sentence of this paragraph wherein the electrophile comprises, consists of, or consists essentially of an alkyl halide or mixtures thereof. The polymer composition of the preceding sentences wherein the electrophile comprises, consists of, or consists essentially of acryloyl chloride.

The polymer composition of any previous sentence wherein the linking group comprises, consists essentially of, or consists of nucleophilic carbon or mixtures thereof. The polymer composition of any previous sentence wherein the linking group comprises, consists essentially of, or consists of oxygen atoms. The polymer composition of any previous sentence wherein the linking group comprises, consists essentially of, or consists of nitrogen atoms. The polymer composition of any previous sentence wherein the linking group comprises, consists essentially of, or consists of sulfur atoms. The polymer composition of any previous sentence wherein the linking group comprises, consists essentially of, or consists of phosphorus atoms. The polymer composition of any previous sentence wherein the linking group comprises, consists essentially of, or consists of aminoxyl radicals or mixtures thereof. The polymer composition of the preceding sentence wherein the linking group comprises, consists essentially of, or consists of 2,2,6,6-Tetramethylpiperidin-1-yl)oxyl or derivatives thereof.

The polymer composition of any previous sentence wherein the antioxidant comprises, consists essentially of, or consists of a radical scavenger or mixtures thereof. The polymer composition of any preceding sentence wherein the antioxidant comprises, consists essentially of, or consists of a hindered amine or mixtures thereof. The polymer composition of any preceding sentence wherein the antioxidant comprises, consists essentially of, or consists of a hydroxylamine or mixtures thereof. The polymer composition of any preceding sentence wherein the antioxidant comprises, consists essentially of, or consists of an arylamine or mixtures thereof. The polymer composition of any preceding sentence wherein the antioxidant comprises, consists essentially of, or consists of a poly(arylamine) or mixtures thereof. The polymer composition of any preceding sentence wherein the antioxidant comprises, consists essentially of, or consists of a phenol or mixtures thereof. The polymer composition of any preceding sentence wherein the antioxidant comprises, consists essentially of, or consists of a polyphenol or mixtures thereof. The polymer composition of any preceding sentence wherein the antioxidant comprises, consists essentially of, or consists of a butylated hydroxytoluene or mixtures thereof. The polymer composition of any preceding sentence wherein the antioxidant comprises, consists essentially of, or consists of a phosphite or mixtures thereof. The polymer composition of any preceding sentence wherein the antioxidant comprises, consists essentially of, or consists of a benzofuranone or mixtures thereof. The polymer composition of any preceding sentence wherein the antioxidant comprises, consists essentially of, or consists of a salicylic acid or mixtures thereof. The polymer composition of any preceding sentence wherein the antioxidant comprises, consists essentially of, or consists of an azulenyl nitrone and derivatives thereof or mixtures thereof. The polymer composition of any preceding sentence wherein the antioxidant comprises, consists essentially of, or consists of a tocopherol or mixtures thereof. The polymer composition of any preceding sentence wherein the antioxidant comprises, consists essentially of, or consists of a 5,5-dimethyl-1-pyrroline-N-oxide or mixtures thereof. The polymer composition of any preceding sentence wherein the antioxidant comprises, consists essentially of, or consists of a cyclic nitrone or mixtures thereof. The polymer composition of any preceding sentence wherein the antioxidant comprises, consists essentially of, or consists of an acyclic nitrone or mixtures thereof. The polymer composition of any preceding sentence wherein the antioxidant comprises, consists essentially of, or consists of a gold-chitosan nanocomposite or mixtures thereof. The polymer composition of any preceding sentence wherein the antioxidant comprises, consists essentially of, or consists of ascorbic acid. The polymer composition of any preceding sentence wherein the antioxidant comprises, consists essentially of, or consists of a molybdenum based antioxidant or mixtures thereof. The polymer composition of any preceding sentence wherein the antioxidant comprises, consists essentially of, or consists of a molybdenum dithiocarbamate or mixtures thereof. The polymer composition of any preceding sentence wherein the antioxidant comprises, consists essentially of, or consists of a molybdenum dithiophosphate or mixtures thereof. The polymer composition of any preceding sentence wherein the antioxidant comprises, consists essentially of, or consists of a molybdenum sulfide or mixtures thereof. The polymer composition of any preceding sentence wherein the antioxidant comprises, consists essentially of, or consists of a molybdenum oxide or mixtures thereof.

The polymer composition of any previous sentence wherein the antioxidant comprises, consists essentially of, or consists of a hydrogen peroxide decomposition catalyst or mixtures thereof. The polymer composition of any preceding sentence wherein the antioxidant comprises, consists essentially of, or consists of a lanthanide series metal cation or mixtures thereof. The polymer composition of any preceding sentence wherein the antioxidant comprises, consists essentially of, or consists of a cerium cation. The polymer composition of any preceding sentence wherein the antioxidant comprises, consists essentially of, or consists of a lanthanum cation.

The polymer composition of any previous sentence wherein the antioxidant comprises, consists essentially of, or consists of an inorganic antioxidant. The polymer composition of any preceding sentence wherein the antioxidant comprises, consists essentially of, or consists of a tungsten containing antioxidant. The polymer composition of any preceding sentence wherein the antioxidant comprises, consists essentially of, or consists of a vanadium containing antioxidant. The polymer composition of any preceding sentence wherein the antioxidant comprises, consists essentially of, or consists of a antimony containing antioxidant.

The polymer composition of any previous sentence wherein the antioxidant comprises, consists essentially of, or consists of heteroaromatic antioxidants. The polymer composition of any previous sentence wherein the antioxidant comprises, consists essentially of, or consists of sulfide antioxidants. The polymer composition of any previous sentence wherein the antioxidant comprises, consists essentially of, or consists of disulfide antioxidants. The polymer composition of any previous sentence wherein the antioxidant comprises, consists essentially of, or consists of polysulfide antioxidants. The polymer composition of any previous sentence wherein the antioxidant comprises, consists essentially of, or consists of sulfurized olefin antioxidants. The polymer composition of any previous sentence wherein the antioxidant comprises, consists essentially of, or consists of zinc based antioxidants. The polymer composition of any previous sentence wherein the antioxidant comprises, consists essentially of, or consists of dithiophosphate antioxidants. The polymer composition of any previous sentence wherein the antioxidant comprises, consists essentially of, or consists of dithiocarbamate antioxidants. The polymer composition of any previous sentence wherein the antioxidant comprises, consists essentially of, or consists of dithiophosphoric acid antioxidants. The polymer composition of any previous sentence wherein the antioxidant comprises, consists essentially of, or consists of phosphine antioxidants. The polymer composition of any preceding sentence wherein the antioxidant comprises, consists essentially of, or consists of triphenylphosphine. The polymer composition of any previous sentence wherein the antioxidant comprises, consists essentially of, or consists of phosphite antioxidants. The polymer composition of any previous sentence wherein the antioxidant comprises, consists essentially of, or consists of hydroquinone antioxidants. The polymer composition of any previous sentence wherein the antioxidant comprises, consists essentially of, or consists of catechol antioxidants. The polymer composition of any previous sentence wherein the antioxidant comprises, consists essentially of, or consists of quinone antioxidants. The polymer composition of any previous sentence wherein the antioxidant comprises, consists essentially of, or consists of flavin antioxidants. The polymer composition of any previous sentence wherein the antioxidant comprises, consists essentially of, or consists of chroman antioxidants. The polymer composition of any previous sentence wherein the antioxidant comprises, consists essentially of, or consists of chromanone antioxidants. The polymer composition of any previous sentence wherein the antioxidant comprises, consists essentially of, or consists of pyridyl antioxidants. The polymer composition of any previous sentence wherein the antioxidant comprises, consists essentially of, or consists of bipyridyl antioxidants. The polymer composition of any previous sentence wherein the antioxidant comprises, consists essentially of, or consists of diphenylamines antioxidants. The polymer composition of any previous sentence wherein the antioxidant comprises, consists essentially of, or consists of phenoxazine antioxidants. The polymer composition of any previous sentence wherein the antioxidant comprises, consists essentially of, or consists of phenothiazines antioxidants. The polymer composition of any previous sentence wherein the antioxidant comprises, consists essentially of, or consists of benzazepines antioxidants. The polymer composition of any previous sentence wherein the antioxidant comprises, consists essentially of, or consists of aminodibenyxl antioxidants. The polymer composition of any previous sentence wherein the antioxidant comprises, consists essentially of, or consists of lignin antioxidants. The polymer composition of any previous sentence wherein the antioxidant comprises, consists essentially of, or consists of lignosulfonate antioxidants. The polymer composition of any previous sentence wherein the antioxidant comprises, consists essentially of, or consists of salicylate antioxidants. The polymer composition of any previous sentence wherein the antioxidant comprises, consists essentially of, or consists of eugenol. The polymer composition of any previous sentence wherein the antioxidant comprises, consists essentially of, or consists of isoeugenol. The polymer composition of any previous sentence wherein the antioxidant comprises, consists essentially of, or consists of N-(4-(phenyl amino)phenyl)acrylamide.

An ion exchange membrane comprising, consisting or consisting essentially of the polymer composition of any previous sentence.

A process for preparing an antioxidant substituted sulfonic acid polymer composition comprising converting the sulfonic acid moieties to sulfonyl halides, followed by covalently bonding the sulfonyl halides with either;

i) a linking group selected from the group consisting of amines and aryl ethers, followed by substituting the linking group with an antioxidant, or
ii) a linking group substituted with an antioxidant selected from the group consisting of substituted amines and substituted aryl ethers.

A process for preparing an antioxidant substituted sulfonyl halide polymer composition comprising covalently bonding the sulfonyl halide moieties with either;

i) a linking group selected from the group consisting of amines and aryl ethers, followed by substituting the linking group with an antioxidant, or
ii) a linking group substituted with an antioxidant selected from the group consisting of substituted amines and substituted aryl ethers.

A process for preparing an antioxidant substituted sulfonic acid polymer composition comprising grafting a sulfonic acid containing polymer with an electrophile to prepare a polymer having an electrophilic linking group, followed by incorporation of a nucleophilic antioxidant onto the electrophile.

A process for preparing an antioxidant substituted sulfonic acid polymer composition comprising grafting a sulfonic acid containing polymer with an olefin containing antioxidant to prepare an antioxidant grafted sulfonic acid polymer.

A fuel cell comprising:

i) bipolar plates
ii) an anode,
iii) a cathode,
iv) diffusion media, and
v) an ion exchange membrane as set forth in paragraph [0046].

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A fuel cell comprising:
(a) bipolar plates,
(b) an anode,
(c) a cathode,
(d) diffusion media, and
(e) an ion exchange membrane comprising a polymer composition comprising sulfonic acid moieties, wherein the polymer comprises 0.2 to 25 mol % relative to the sulfonic acid moieties of an antioxidant covalently bonded directly, or through a linking group, to the sulfonic acid moieties of the polymer.

2. The fuel cell of claim 1, wherein the polymer composition comprises a perfluorosulfonic acid polymer.

3. The fuel cell of claim 1, wherein the polymer composition comprises a sulfonated poly (benzimidazole) polymer.

4. The fuel cell of claim 1, wherein the polymer composition comprises a sulfonated poly (ether ether ketone) polymer.

5. The fuel cell of claim 1, wherein the polymer composition comprises a poly (styrene sulfonate) polymer.

6. The fuel cell of claim 1, wherein the polymer composition comprises a sulfonated polyvinyl chloride.

7. The fuel cell of claim 1, wherein the polymer composition comprises a 2-acrylamido-2-methylpropane sulfonic acid (AMPS) polymer.

8. The fuel cell of claim 1, wherein the linking group comprises, an amine or an aryl ether.

9. The fuel cell of claim 8, wherein the amine comprises ammonia.

10. The fuel cell of claim 8, wherein the aryl ether comprises phenyl ether.

11. The fuel cell of claim 1, wherein the linking group comprises an electrophile.

12. The fuel cell of claim 11, wherein the electrophile comprises a carboxyl containing olefin.

13. The fuel cell of claim 11, wherein the electrophile comprises a dicarboxylic acid.

14. The fuel cell of claim 11, wherein the electrophile comprises maleic acid.

* * * * *